US009228314B2

(12) United States Patent
Robl et al.

(10) Patent No.: US 9,228,314 B2
(45) Date of Patent: Jan. 5, 2016

(54) QUICK COUPLER HYDRAULIC CONTROL SYSTEM

(71) Applicant: Caterpillar Inc., Peoria, IL (US)

(72) Inventors: Troy Robl, St. George, KS (US); Trent Randall Stefek, Wamego, KS (US); Rudy Van Mills, Manhattan, KS (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 13/889,927

(22) Filed: May 8, 2013

(65) Prior Publication Data

US 2014/0331663 A1 Nov. 13, 2014

(51) Int. Cl.

*F15B 13/07* (2006.01)
*F16D 31/02* (2006.01)
*E02F 3/36* (2006.01)
*E02F 9/20* (2006.01)
*E02F 9/22* (2006.01)

(52) U.S. Cl.

CPC ............. *E02F 3/3663* (2013.01); *E02F 9/2025* (2013.01); *E02F 9/2221* (2013.01); *E02F 9/2285* (2013.01); *F15B 13/07* (2013.01); *Y10T 29/49236* (2015.01)

(58) Field of Classification Search

CPC ...... F15B 13/07; E02F 3/3663; E02F 9/2285; F16L 37/62
USPC ............................................... 60/470; 91/432
See application file for complete search history.

(56) References Cited

U.S. PATENT DOCUMENTS

| | | | |
|---|---|---|---|
| 3,556,323 | A | 1/1971 | Heimmermann |
| 4,214,840 | A | 7/1980 | Beales |
| 4,295,287 | A | 10/1981 | Natzke et al. |
| 4,373,852 | A | 2/1983 | Maurer |
| 4,417,844 | A | 11/1983 | de Pingon |

(Continued)

FOREIGN PATENT DOCUMENTS

| | | |
|---|---|---|
| AU | 2009201972 | 11/2009 |
| EP | 1318242 | 6/2003 |

(Continued)

OTHER PUBLICATIONS

"Earth-moving—Quick Couplers—Safety" Draft International Standard ISO/DIS 13031 © International Organization for Standardization (2011).

(Continued)

*Primary Examiner* — Michael Leslie
(74) *Attorney, Agent, or Firm* — Miller, Matthias & Hull LLP

(57) ABSTRACT

A hydraulic system for an implement coupler assembly of a machine includes a coupler cylinder, a control valve connecting the coupler cylinder to a pressurized fluid source and a low pressure reservoir, and a sequence valve and a check valve connected in parallel between the coupler cylinder and the control valve. An implement cylinder provides a pilot pressure for the sequence valve. The coupler cylinder extends to a locked position when the control valve provides pressurized fluid through the check valve to a head end of the coupler cylinder. The coupler cylinder retracts to an unlocked position when the control valve provides pressurized fluid to a rod end of the coupler cylinder if the implement cylinder provides pilot pressure sufficient to open the sequence valve and connect the head end of the coupler cylinder to the low pressure reservoir.

20 Claims, 9 Drawing Sheets

(56) References Cited

U.S. PATENT DOCUMENTS 4,480,955 A 11/1984 Andrews et al.
4,625,988 A 12/1986 Witchey et al.
4,632,595 A 12/1986 Schaeff
4,779,364 A 10/1988 Holmdal
4,790,084 A 12/1988 Anderson et al.
4,845,867 A 7/1989 Albrecht
4,846,624 A 7/1989 Hohn
4,881,867 A 11/1989 Essex et al.
4,906,161 A 3/1990 Weyer
4,955,779 A 9/1990 Knackstedt
4,958,981 A 9/1990 Uchihashi
5,010,962 A 4/1991 Bloom, Jr.
5,024,010 A 6/1991 Hulden
5,082,389 A 1/1992 Balemi
5,107,610 A 4/1992 Fusco
5,108,252 A 4/1992 Gilmore, Jr. et al.
5,110,254 A 5/1992 Aubrey
5,125,788 A 6/1992 Stenger
5,141,385 A 8/1992 Tibbatts et al.
5,145,313 A 9/1992 Weyer
5,147,173 A 9/1992 Fauber et al.
5,179,794 A 1/1993 Ballinger
5,195,865 A 3/1993 Koehl
5,222,695 A 6/1993 Lake
5,237,762 A 8/1993 Sandberg
5,242,258 A 9/1993 Weyer
5,256,026 A 10/1993 Kishi
5,324,162 A 6/1994 Kishi
5,332,353 A 7/1994 Arnold
5,333,400 A 8/1994 Sonerud
5,350,250 A 9/1994 Nagler
5,360,313 A 11/1994 Gilmore, Jr. et al.
5,382,110 A 1/1995 Perotto et al.
5,394,630 A 3/1995 Moinat
5,400,531 A 3/1995 Brown
5,415,235 A 5/1995 Gebauer
5,423,625 A 6/1995 Gebauer et al.
5,431,528 A 7/1995 Jenkins et al.
5,456,030 A 10/1995 Barone et al.
5,465,513 A 11/1995 Sonerud
5,467,542 A 11/1995 Hulden
5,484,250 A 1/1996 Gilmore, Jr. et al.
5,487,230 A 1/1996 Weyer
5,494,396 A 2/1996 Geier et al.
5,575,093 A 11/1996 Pratt et al.
5,581,917 A 12/1996 Barden
5,584,644 A 12/1996 Droegemueller
5,597,283 A 1/1997 Jones
5,611,158 A 3/1997 Pratt et al.
5,618,157 A 4/1997 Pratt et al.
5,621,987 A 4/1997 Pratt et al.
5,634,735 A 6/1997 Horton et al.
5,642,785 A 7/1997 Dam-Rasmussen
5,685,689 A 11/1997 Schneider et al.
5,692,325 A 12/1997 Kuzutani
5,692,850 A 12/1997 Kimble et al.
5,692,852 A 12/1997 Collins
5,727,342 A 3/1998 Horton
5,779,429 A 7/1998 Poole
5,791,863 A 8/1998 Droegemueller
5,802,753 A 9/1998 Raunisto
5,813,822 A 9/1998 Pisco
5,820,332 A 10/1998 Philips et al.
5,865,594 A 2/1999 Kim
5,890,871 A 4/1999 Woeman
5,915,837 A 6/1999 Brown et al.
5,951,192 A 9/1999 Collins
5,966,850 A 10/1999 Horton
5,974,706 A 11/1999 Kaczmarski et al.
5,983,535 A 11/1999 Kaczmarski et al.
6,000,154 A 12/1999 Berard et al.
6,042,295 A 3/2000 Barden
6,058,633 A 5/2000 Barden
6,074,120 A 6/2000 Williams
6,088,393 A 7/2000 Knee et al.
6,088,938 A 7/2000 Logan
6,088,939 A 7/2000 Logan
6,108,951 A 8/2000 Renfrow et al.
6,123,501 A 9/2000 Pisco
6,132,130 A 10/2000 McCann
6,132,131 A 10/2000 Nakamura et al.
6,139,212 A 10/2000 Heiple
6,154,989 A 12/2000 Kaczmarski et al.
6,158,950 A 12/2000 Wilt et al.
6,163,988 A 12/2000 Pratt et al.
6,163,989 A 12/2000 Kaczmarski et al.
6,168,369 B1 1/2001 Bright et al.
6,196,595 B1 3/2001 Sonerud
6,202,331 B1 3/2001 Kobayashi
D440,983 S 4/2001 Miller et al.
6,227,792 B1 5/2001 Baker et al.
6,231,296 B1 5/2001 Blomgren
6,233,852 B1 5/2001 Pemberton
6,241,455 B1 6/2001 Schupback et al.
6,254,331 B1 7/2001 Pisco et al.
6,260,357 B1 7/2001 Goodfellow et al.
RE37,320 E 8/2001 Horton
RE37,339 E 8/2001 Horton
6,301,811 B1 10/2001 Gilmore, Jr.
6,302,611 B1 10/2001 De Gier et al.
6,305,106 B1 10/2001 McLellan
6,308,442 B1 10/2001 Naka et al.
6,312,212 B1 11/2001 Burlew, Jr.
6,332,732 B1 12/2001 Mantovani
6,332,747 B1 12/2001 Lee
6,336,785 B1 1/2002 Kunzman
6,350,079 B1 2/2002 Williams
D455,762 S 4/2002 Kaczmarski et al.
6,364,561 B1 4/2002 Droegemueller
6,379,075 B1 4/2002 Shamblin et al.
6,385,872 B1 5/2002 Mieger et al.
6,386,822 B1 5/2002 Burr
6,408,875 B1 6/2002 Nishikawa et al.
6,422,805 B1 7/2002 Miller
6,428,265 B1 8/2002 Gilmore, Jr.
6,431,785 B1 8/2002 Melander
6,438,875 B1 8/2002 Kimble et al.
6,481,124 B1 11/2002 Miller et al.
6,487,800 B1 12/2002 Evans et al.
6,493,967 B2 12/2002 Holmes et al.
6,499,904 B2 12/2002 Nye
6,508,616 B2 1/2003 Hung
6,513,266 B1 2/2003 Ijiri
6,513,268 B2 2/2003 Lee et al.
6,533,528 B2 3/2003 Degen et al.
6,533,529 B2 3/2003 Waggoner
6,539,650 B2 4/2003 Kaczmarski et al.
6,606,805 B2 8/2003 Kimble
6,615,514 B2 9/2003 Ruiz
6,625,909 B1 9/2003 Miller et al.
6,629,811 B1 10/2003 Husson
6,644,885 B2 11/2003 Dam-Rasmussen
6,655,053 B1 12/2003 Cummungs
6,658,770 B2 12/2003 Heiple
6,659,708 B2 12/2003 Heiple
6,659,709 B1 12/2003 Anderson
6,688,801 B2 2/2004 Husson
6,691,438 B2 2/2004 Fatemi
6,709,224 B2 3/2004 Heiple
6,718,663 B1 4/2004 Geraghty
6,725,584 B2 4/2004 Inoue et al.
6,773,223 B2 * 8/2004 Harris .................. E02F 3/3663 37/468
6,811,371 B2 11/2004 Mantovani
6,812,851 B1 11/2004 Dukach et al.
6,813,851 B2 11/2004 Mieger et al.
6,857,842 B2 2/2005 Heiple
6,877,259 B2 4/2005 Nishimura et al.
6,881,002 B2 4/2005 Fatemi
6,886,279 B2 5/2005 Kimble
6,899,509 B1 5/2005 Mailleux
6,902,346 B2 6/2005 Steig, Jr. et al.
6,922,926 B2 8/2005 Miller et al.
7,047,866 B2 5/2006 Fatemi et al.

(56) References Cited

U.S. PATENT DOCUMENTS

| | | | |
|---|---|---|---|
| 7,367,256 | B2 | 5/2008 | Fatemi et al. |
| 7,426,796 | B2 | 9/2008 | Cunningham et al. |
| 7,430,955 | B2 | 10/2008 | Bitter |
| 7,455,494 | B2 | 11/2008 | Krieger |
| 7,648,305 | B2 | 1/2010 | Beales |
| 7,654,019 | B2 | 2/2010 | Yeager et al. |
| 7,797,862 | B2 | 9/2010 | Darale et al. |
| 7,828,070 | B2 | 11/2010 | Calvert et al. |
| 7,984,575 | B2 | 7/2011 | Robl et al. |
| 8,262,310 | B2 | 9/2012 | Sikorski et al. |
| 8,281,506 | B2 | 10/2012 | Stefek et al. |
| 8,684,623 | B2 * | 4/2014 | Robl ......................... F16D 1/00 37/468 |
| 2001/0026729 | A1 | 10/2001 | Trowbridge |
| 2001/0053323 | A1 | 12/2001 | Godwin et al. |
| 2002/0066215 | A1 | 6/2002 | Kaczmarski et al. |
| 2002/0071754 | A1 | 6/2002 | Fatemi |
| 2002/0098032 | A1 | 7/2002 | Nye |
| 2002/0136597 | A1 | 9/2002 | Nishikawa et al. |
| 2002/0157286 | A1 | 10/2002 | Fatemi |
| 2002/0157287 | A1 | 10/2002 | Mieger et al. |
| 2002/0170211 | A1 | 11/2002 | Lee et al. |
| 2002/0174575 | A1 | 11/2002 | Inoue et al. |
| 2002/0176772 | A1 | 11/2002 | Hung |
| 2002/0178625 | A1 | 12/2002 | Kimble et al. |
| 2003/0005605 | A1 | 1/2003 | Kaczmarski et al. |
| 2003/0095858 | A1 | 5/2003 | Mantovani |
| 2003/0099507 | A1 | 5/2003 | Fatemi |
| 2003/0103806 | A1 | 6/2003 | Short |
| 2003/0131505 | A1 | 7/2003 | Heiple |
| 2003/0133779 | A1 | 7/2003 | Heiple |
| 2003/0154636 | A1 | 8/2003 | Miller et al. |
| 2003/0175072 | A1 | 9/2003 | Steig, Jr. et al. |
| 2003/0204972 | A1 | 11/2003 | Cunningham et al. |
| 2003/0215320 | A1 | 11/2003 | Harris et al. |
| 2003/0233773 | A1 | 12/2003 | Mieger et al. |
| 2004/0000077 | A1 | 1/2004 | Fatemi |
| 2004/0028515 | A1 | 2/2004 | Martin |
| 2004/0057784 | A1 | 3/2004 | Geraghty |
| 2004/0076504 | A1 | 4/2004 | Geraghty |
| 2004/0165979 | A1 | 8/2004 | Fatemi |
| 2004/0184875 | A1 | 9/2004 | Mieger et al. |
| 2004/0218971 | A1 | 11/2004 | Lim et al. |
| 2004/0247382 | A1 | 12/2004 | Leemans et al. |
| 2005/0169703 | A1 | 8/2005 | Fatemi |
| 2005/0204591 | A1 | 9/2005 | Mieger et al. |
| 2005/0214105 | A1 | 9/2005 | Steig, Jr. et al. |
| 2007/0166143 | A1 | 7/2007 | Hart et al. |
| 2009/0007465 | A1 | 1/2009 | Robl et al. |
| 2009/0282712 | A1 | 11/2009 | Pruszynski |
| 2009/0311086 | A1 | 12/2009 | Steig, Jr. et al. |
| 2010/0061799 | A1 | 3/2010 | Hill |
| 2010/0192425 | A1 | 8/2010 | Miller et al. |
| 2010/0232920 | A1 | 9/2010 | Calvert et al. |
| 2011/0010915 | A1 | 1/2011 | Calvert et al. |
| 2011/0091267 | A1 | 4/2011 | Hill |
| 2011/0209608 | A1 | 9/2011 | Stefek et al. |
| 2013/0000292 | A1 | 1/2013 | Edler et al. |
| 2013/0008153 | A1 | 1/2013 | Stefek et al. |
| 2013/0160268 | A1 | 6/2013 | Parker et al. |
| 2013/0160269 | A1 | 6/2013 | Parker et al. |

FOREIGN PATENT DOCUMENTS

| | | |
|---|---|---|
| JP | 09209391 | 8/1997 |
| JP | 10082066 | 3/1998 |
| JP | 11181819 | 7/1999 |
| JP | 2000001872 | 1/2000 |
| NZ | 233302 | 4/1990 |
| WO | 2007064651 | 6/2007 |
| WO | 2007114601 | 10/2007 |
| WO | 2011033253 | 3/2011 |

OTHER PUBLICATIONS

U.S. Patent Application of Troy Curtis Robl et al. entitled “Tool Coupler Having Anti-Release Mechanism” filed on May 30, 2012.

U.S. Patent Application of Troy Curtis Robl et al. entitled “Quick Coupler” filed on May 30, 2012.

U.S. Patent Application of Troy Curtis Robl et al. entitled “Tool Coupler System Having Multiple Pressure Sources” filed on May 30, 2012.

U.S. Patent Application of Troy C. Robl et al. entitled “Locking System for Quick Coupler” filed on Apr. 2, 2013.

U.S. Patent Application of Troy Curtis Robl et al. entitled “Tool Coupler Having a Modular Frame Construction” filed on Jan. 25, 2013.

* cited by examiner

QUICK COUPLER HYDRAULIC CONTROL SYSTEM

TECHNICAL FIELD

The present disclosure relates generally to an implement coupler assembly and, more particularly, to a hydraulic control system for an implement coupler assembly for interchangeably mounting different implements on a single host machine.

BACKGROUND

Machines, for example backhoes, excavators, graders, and loaders, commonly have linkage that is movable to control the motion of a connected implement such as a bucket, a blade, a hammer, a grapple and the like. When equipped with a single implement, these machines become specialized machines that are primarily used for a single purpose. Although adequate for some situations, the single purpose machines can have limited functionality and versatility. An implement coupler assembly can be used to increase the functionality and versatility of a host machine by allowing different implements to be quickly and interchangeably connected to the linkage of the machine.

Implement coupler assemblies are generally known and include a frame connected to the linkage of a machine, and hooks, latches, wedges, pins and the like that protrude from the frame. The hooks of an implement coupler assembly engage corresponding pins of an implement to thereby connect the implement to the linkage. To help prevent undesired disengagement of the hooks from the pins, implement coupler assemblies can be equipped with a hydraulic cylinder that locks the hooks in place against the pins.

When connecting or disconnecting an implement to a host machine, precautions should be taken to help ensure the procedure is performed properly. For example, the implement should be in a desired resting position before decoupling is performed so that the implement does not move in an unexpected manner after the decoupling. In addition, fluid provided to the hydraulic cylinder of the implement coupler assembly should be at a pressure that allows proper operation of the implement coupler assembly without causing damage to the assembly.

One example of an implement coupler assembly is disclosed in U.S. Pat. No. 8,281,506 issued to Stefek et al. on Oct. 9, 2012. The Stefek et al. patent discloses an implement coupler assembly for a machine. The implement coupler assembly may have a coupler frame, a first latch, a second latch, and a hydraulic actuator or cylinder connected to move the second latch relative to the first latch and the coupler frame. The hydraulic cylinder may have a first chamber, a second chamber, and a pressure valve with a check element movable to allow a flow of fluid into the first chamber based on a pressure of fluid in the first chamber, and a pressure regulating element movable to allow a flow of fluid out of the first chamber based on a pressure of fluid in the second chamber. The implement coupler assembly may additionally have a first pilot passage configured to communicate fluid from the second chamber with the pressure regulating element, and a second pilot passage configured to communicate fluid from the first chamber with the pressure regulating element. The hydraulic cylinder of the implement coupler assembly receives pressurized fluid from a first chamber of an implement hydraulic cylinder that controls the position of the implement attached to the coupler assembly. The pressure in the implement cylinder maintains the pressure in the coupler cylinder. The implement coupler assembly is effective in coupling and decoupling the implement, but opportunities may still exist for further improvements to the technology.

SUMMARY OF THE DISCLOSURE

In one aspect of the present disclosure, a hydraulic system for locking and unlocking an implement coupler assembly of a machine is disclosed. The implement coupler assembly may have a coupler frame and a locking system connected to the coupler frame, and may have a locked position and an unlocked position. The hydraulic system may include a coupler hydraulic actuator having a first chamber and a second chamber separated from the first chamber. The coupler hydraulic actuator may be connected to the implement coupler assembly, fluid flow into the first chamber may cause the coupler hydraulic actuator to move the implement coupler assembly toward the locked position, and fluid flow out of the first chamber may cause the coupler hydraulic actuator to move the implement coupler assembly toward the unlocked position. The hydraulic system may further include a sequence valve having a first sequence port in fluid communication with the first chamber of the coupler hydraulic actuator, a second sequence port, and a first pilot port in fluid communication with an implement hydraulic actuator operatively connected to the implement coupler assembly to move the implement coupler assembly relative to an implement system of the machine. The sequence valve may prevent fluid flow from the first sequence port to the second sequence port when a fluid pressure at the first pilot port is less than a predetermined threshold pressure, and the sequence valve may be movable to allow fluid flow from the first sequence port to the second sequence port and out of the first chamber when a pilot fluid pressure of the implement hydraulic actuator at the first pilot port is greater than the predetermined threshold pressure.

In another aspect of the present disclosure, a method of decoupling an implement from an implement coupler assembly of a machine is disclosed. The method may include communicating pressurized fluid to a first chamber of a coupler hydraulic actuator to move the coupler hydraulic actuator in a direction to unlock the implement coupler assembly, and communicating pressurized fluid from a second chamber of the coupler hydraulic actuator to a first sequence port of a sequence valve. The method may further include communicating pressurized fluid from an implement hydraulic actuator to a first pilot port of the sequence valve. A fluid pressure of pressurized fluid at the first pilot port may determine a position of the sequence valve between a closed position preventing fluid flow from the first sequence port to a second sequence port of the sequence valve, and an open position allowing fluid flow from the first sequence port to the second sequence port and to low pressure reservoir in fluid communication with the second sequence port.

In a further aspect of the present disclosure, a hydraulic system for locking and unlocking an implement coupler assembly of a machine is disclosed. The implement coupler assembly may have a coupler frame and a locking system connected to the coupler frame and having a locked position and an unlocked position. The hydraulic system may include a coupler hydraulic actuator having a first chamber and a second chamber separated from the first chamber, and a coupler control valve having a first control valve port in fluid communication with a pressurized fluid source of the machine, a second control valve port in fluid communication with a low pressure reservoir of the machine, a third control valve port and a fourth control valve port. The hydraulic system may further include a sequence valve having a first sequence port in fluid communication with the first chamber, a second sequence port in fluid communication with the fourth control valve port, and a first pilot port in fluid communication with an implement hydraulic actuator operatively connected to the implement coupler assembly to move the implement coupler assembly relative to an implement system of the machine, and a check valve having a first check valve port in fluid communication with the first chamber and a second check valve port in fluid communication with the fourth control valve port. The check valve may be moveable to allow fluid flow from the first check valve port to the second check valve port and into the first chamber when a fluid pressure at the second check valve port is greater than a fluid pressure at the first check valve port. The coupler hydraulic actuator may be connected to the implement coupler assembly, fluid flow into the first chamber may cause the coupler hydraulic actuator to move the implement coupler assembly toward the locked position, and fluid flow out of the first chamber may cause the coupler hydraulic actuator to move the implement coupler assembly toward the unlocked position. The sequence valve may prevent fluid flow from the first sequence port to the second sequence port when a fluid pressure at the first pilot port is less than a predetermined threshold pressure, and the sequence valve may be movable to allow fluid flow out of the first chamber when a pilot fluid pressure of the implement hydraulic actuator at the first pilot port is greater than the predetermined threshold pressure.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112(f).

Figure 1:
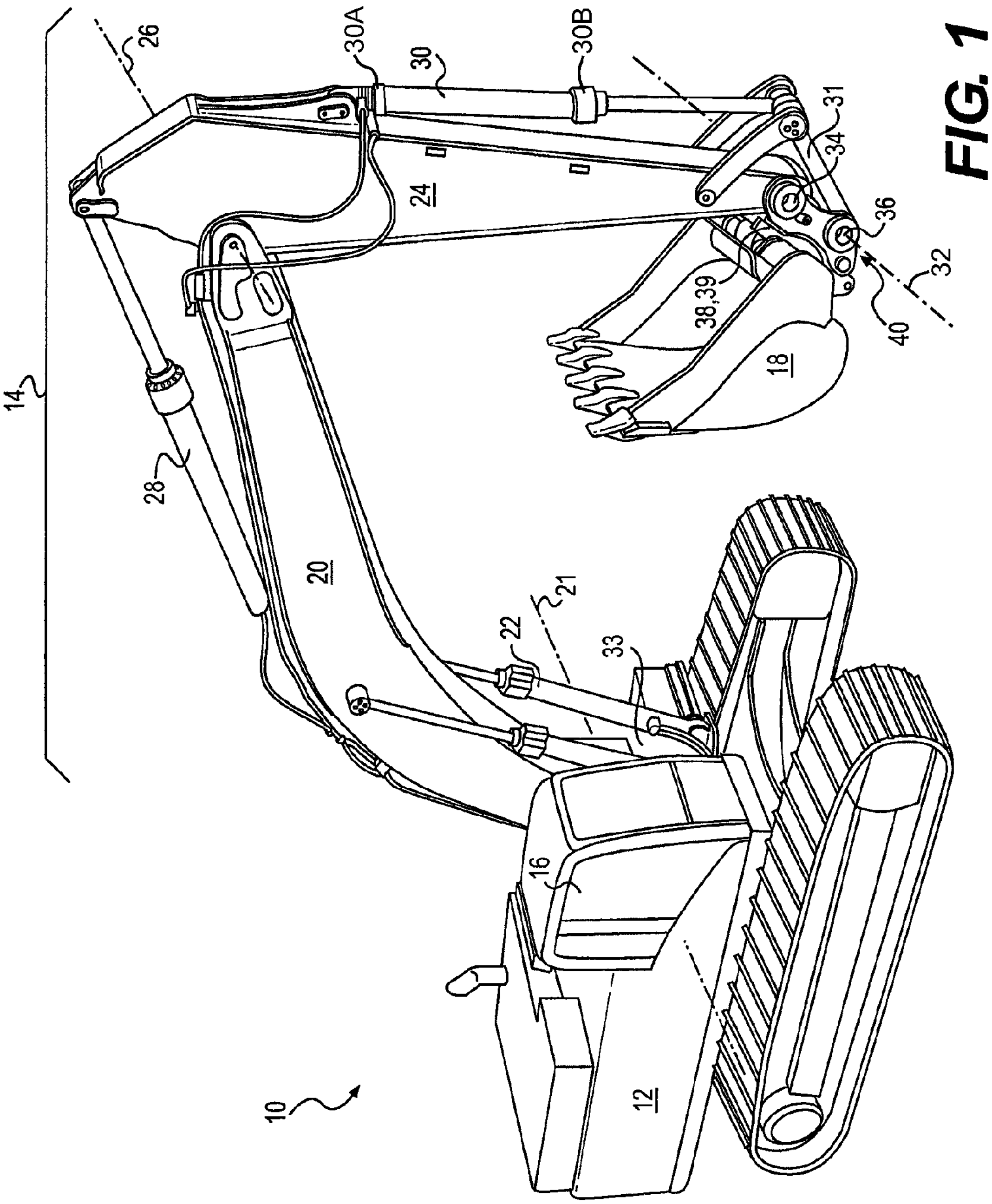
FIG. 1 is a perspective view of an exemplary machine having an implement coupler assembly for connecting an implement to an end of a stick member.

FIG. 1 illustrates an exemplary machine 10. The machine 10 may be a fixed or mobile machine that performs some type of operation associated with an industry, such as mining, construction, farming, transportation, or any other industry known in the art. For example, the machine 10 may be an earth moving machine such as an excavator, a backhoe, a loader, or a motor grader. The machine 10 may include a power source 12, an implement system 14 driven by power source 12, and an operator station 16 situated for manual control of an implement system 14.

The implement system 14 may include a linkage acted on by hydraulic cylinders to manipulate an implement 18. Specifically, the implement system 14 may include a boom member 20 that is vertically pivotal about a horizontal boom axis 21 by a pair of adjacent, double-acting, hydraulic cylinders 22, and a stick member 24 that is vertically pivotal about a stick axis 26 by a single, double-acting, hydraulic cylinder 28. The implement system 14 may further include a single, double-acting, hydraulic cylinder 30 that is connected to vertically pivot the implement 18 about an implement axis 32. In one embodiment, the implement cylinder 30 may be connected at a head end 30A to a portion of the stick member 24, and at a rod end 30B to the implement 18 by way of a power link 31. The boom member 20 may be pivotally connected to a frame 33 of machine 10. The stick member 24 may pivotally connect boom member 20 to the implement 18.

Each of the hydraulic cylinders 22, 28, 30 may include a tube portion and a piston assembly arranged within the tube portion to form a head end pressure chamber and a rod end pressure chamber. The pressure chambers may be selectively supplied with pressurized fluid and drained of the pressurized fluid to cause the piston assembly to displace within the tube portion, thereby changing the effective length of the hydraulic cylinders 22, 28, 30. The flow rate of fluid into and out of the pressure chambers may relate to a velocity of the hydraulic cylinders 22, 28, 30, while a pressure differential between the head end and the rod end pressure chambers may relate to a force imparted by the hydraulic cylinders 22, 28, 30 on the associated linkage members. The expansion and retraction of the hydraulic cylinders 22, 28, 30 may function to assist in moving the implement 18.

Numerous different implements 18 may be attachable to a single machine 10 and controllable via the operator station 16. The implement 18 may include any device used to perform a particular task such as, for example, a bucket as shown, a fork arrangement, a blade, a grapple, or any other task-performing device known in the art. Although connected in the embodiment of FIG. 1 to pivot relative to the machine 10, the implement 18 may additionally rotate, slide, swing, lift, or move in any other manner known in the art. The implement 18 may include a forward implement pin 34 and a rear implement pin 36 that facilitate connection to the implement system 14. The implement pins 34, 36 may be joined at their ends by a pair of spaced apart implement brackets 38, 39 that are welded to an external surface of the implement 18.

Figure 2:
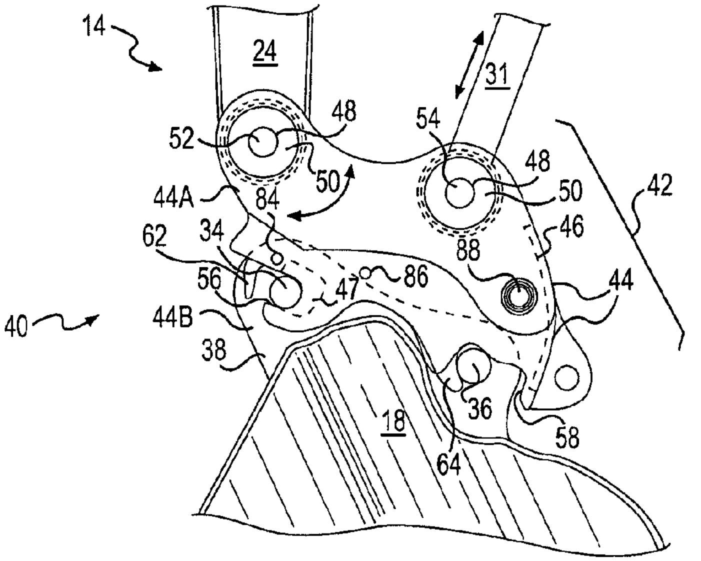
FIG. 2 is a side view of an exemplary stick member and implement coupler assembly of the machine of FIG. 1.
Figure 3:
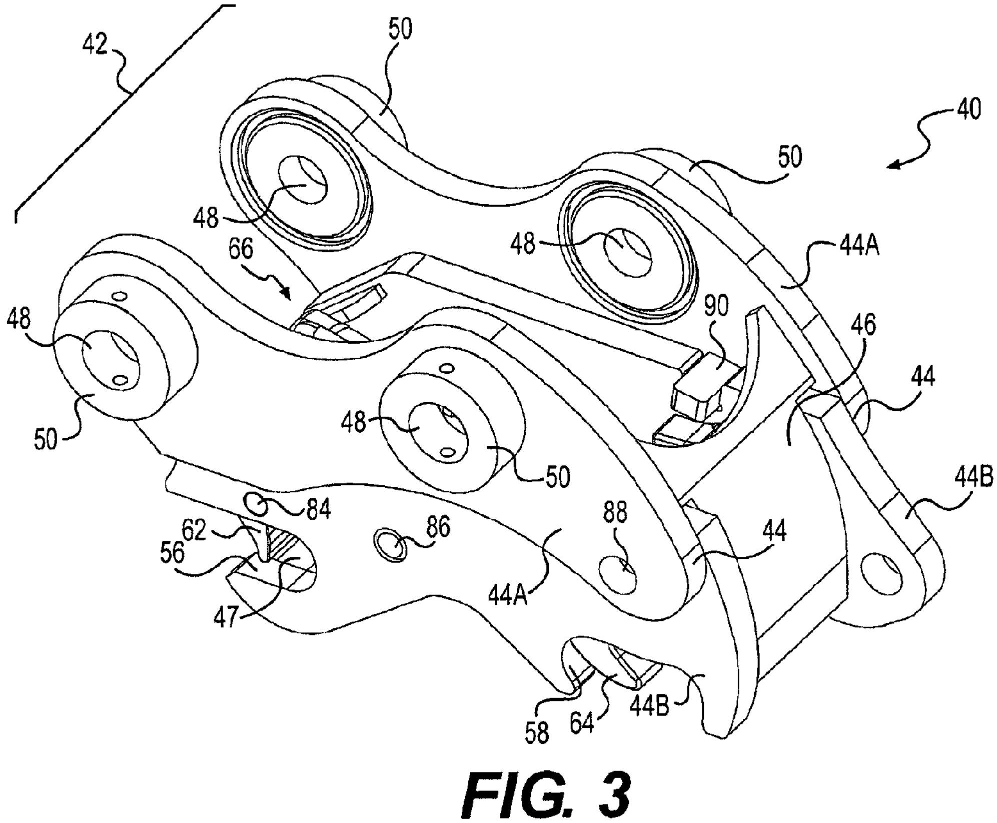
FIG. 3 is a perspective view of the implement coupler assembly of FIG. 2.

An implement coupler assembly 40 may be located to facilitate a quick connection between the linkage of the implement system 14 and the implement 18. As shown in FIGS. 2 and 3, the exemplary implement coupler assembly 40 may include a frame 42 having a pair of spaced apart, parallel side plate members 44 (only one shown in FIG. 2) that are interconnected at one end by a cross plate 46 and at an opposing end by a cross brace 47. Each side plate member 44 may comprise upper and lower plates 44A, 44B that are horizontally offset from and welded to each other. It will be appreciated, however, that one-piece side plate members may be used instead of the exemplary upper and lower plates 44A, 44B if desired.

In one embodiment, the upper plates 44A may each include two spaced apart pin openings 48, and corresponding collars 50 provided adjacent to each pin opening 48. The pin openings 48 in one upper plate 44A may be substantially aligned with the pin openings 48 in the opposing upper plate 44A, such that a first stick pin 52 of the stick member 24 and a second stick pin 54 (removed from FIG. 3 for clarity) of the power link 31 may pass there through and be retained by the side plate members 44. In this manner, extension and retraction of the implement cylinder 30 acting through the power link 31 and the second stick pin 54 may function to pivot the implement coupler assembly 40 about the first stick pin 52.

The implement coupler assembly 40 may be detachably connected to the implement 18 on a side opposite the stick member 24 and the power link 31. In the exemplary embodiment, each lower plate 44B may be located inward of the implement brackets 38, 39 and include a rear-located, rear-facing notch 56 and a front-located, bottom-facing notch 58. The notches 56, 58 may be configured to receive the implement pins 34, 36, respectively. The cross brace 47, located at a front end of the side plate members 44, may be shaped to correspond with the shape of the notch 56 such that a jaw portion of the cross brace 47 may also receive and support the implement pin 34.

Figure 4:
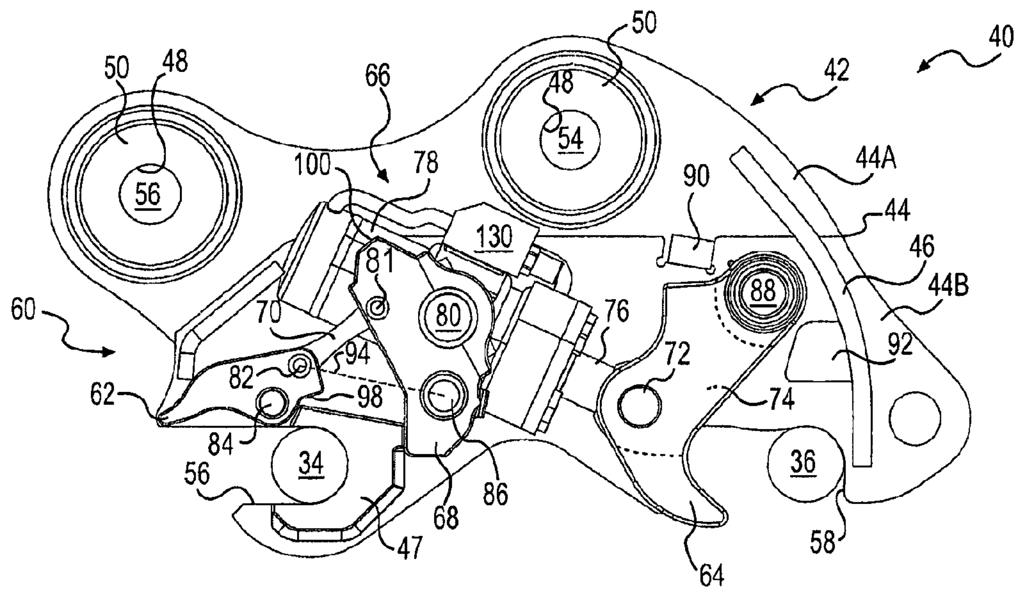
FIG. 4 is a side view of the implement coupler assembly of FIG. 2 shown in an unlatched position.
Figure 5:
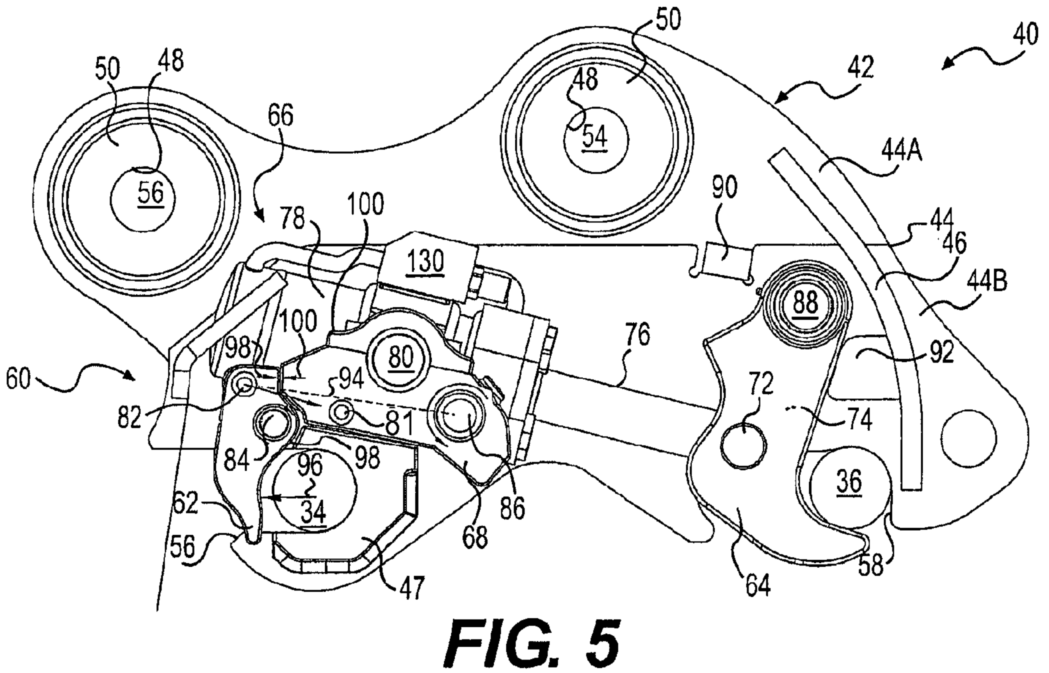
FIG. 5 is a side view of the implement coupler assembly of FIG. 2 shown in a latched position.

FIGS. 4 and 5 are side views of the implement coupler assembly 40 having a side plate member 44 cut away for illustrating a locking system 60 that includes first and second securing hooks or latches 62, 64 for retaining the implement pins 34, 36 in the notches 56, 58, respectively. FIG. 4 illustrates the locking system 60 in an unlocked position, while FIG. 5 illustrates the locking system 60 in a locked position. It should be appreciated that a gap may exist between the latch 62 and the implement pin 34 when the locking system 60 is latched or in the locked position.

The locking system 60 may include a number of interconnected components for moving the latches 62, 64 between the locked and unlocked positions. For example, the locking system 60 may include a hydraulic actuator such as a coupler cylinder 66 having a head end 66A with a first chamber and a rod end 66B with a second chamber, a pair of rocker assemblies 68 (one located on each side of the coupler cylinder 66), and a pair of connector links 70 pivotally connecting the rocker assemblies 68 to opposing sides of the latch 62. The latch 64 may have a generally hollow center portion 74 configured to receive a piston rod 76 of the coupler cylinder 66, and a rod pin 72 may pass through corresponding bores formed in opposing sides of the latch 64 and in piston rod 76. The rocker assemblies 68 may be pivotally mounted to opposing sides of a tube portion 78 of the coupler cylinder 66 by way of the tube pins 80 that extend from the respective sides of the tube portion 78 through corresponding bores formed in the rocker assemblies 68. First and second link pins 81, 82 may pivotally join the connector links 70 at one end to the rocker assemblies 68 and at an opposing end to the latch 62. The link pins 81 may pass through corresponding bores formed in the rocker assemblies 68 and the connector links 70, while the link pins 82 may pass through corresponding bores formed in the latch 62 and the connector links 70.

In the exemplary embodiment, the locking system 60 may be connected to the frame 42 of the implement coupler assembly 40 at multiple locations. First, a latch pin 84 may pass through corresponding bores formed in the latch 62 and the side plate members 44 for pivotally connecting the latch 62 to the frame 42. Second, a rocker pin 86 associated with both rocker assemblies 68 may pass through corresponding bores formed in each rocker assembly 68 and in each side plate member 44 for pivotally connecting the rocker assemblies 68 to the frame 42. Third, a latch pin 88 may pass through corresponding bores formed in the latch 64 and the side plate members 44 for pivotally connecting the latch 64 to the frame 42.

To unlock the latches 62, 64 from the implement pins 34, 36, the piston rod 76 may retract into the tube portion 78 of the coupler cylinder 66. The retracting movement of the piston rod 76 may cause the latch 64 to pivot in a clockwise direction about the latch pin 88, until the latch 64 abuts a first end stop 90 that protrudes from one of the side plate members 44. At this point in time, the implement pin 36 may be unlocked from the implement coupler assembly 40. Continued retraction of the piston rod 76 may push the latch 64 against the end stop 90 and thereby cause the tube portion 78 to be pulled toward the latch 64. The pulling of the tube portion 78 toward the latch 64 may cause the rocker assemblies 68 to pivot about the rocker pins 86 in a clockwise direction and thereby cause the connector links 70 to pivot the latch 62 in a clockwise direction about the latch pin 84 and away from the implement pin 34. At this point in time, the implement pin 34 may be unlocked from the implement coupler assembly 40.

To lock the implement pins 34, 36 in position with the latches 62, 64, the piston rod 76 may extend from the tube portion 78 of the coupler cylinder 66. The extending movement of the piston rod 76 may cause the latch 64 to pivot in a counterclockwise direction about the latch pin 88, until the latch 64 engages a second end stop 92 that protrudes from one of the side plate members 44. At this point in time, the implement pin 36 may be locked to the implement coupler assembly 40. Continued extension of the piston rod 76 may push the latch 64 against the end stop 92 and thereby cause the tube portion 78 to be pushed away from the latch 64. The pushing of the tube portion 78 away from the latch 64 may cause the rocker assemblies 68 to pivot about the rocker pins 86 in a counterclockwise direction and thereby cause the connector links 70 to pivot the latch 62 in a counterclockwise direction about the latch pin 88 and toward the implement pin 34. At this point in time, the implement pin 34 may be locked to the implement coupler assembly 40.

The locking system 60 may include an over-center feature that helps to prevent the latches 62, 64 from unlocking unexpectedly, should the coupler cylinder 66 fail. In particular, when moving from the locked position to the unlocked position, the locking system 60 may first rotate the latch 62 counterclockwise toward the implement pin 34 by a small amount, before rotating the latch 62 clockwise away from the implement pin 34. This is because the link pin 81 may be located below a centerline 94 that extends from the link pin 82 to the rocker pin 86 when fully locked, and moved through the centerline 94 to a point above the centerline 94 during the unlocking. The link and the rocker pins 82 and 86 may be furthest apart when aligned with the centerline 94, and closer together when the link pin 81 is either above or below the centerline 94. Thus, when the link pin 81 is below the centerline 94 during clockwise rotation of the rocker assemblies 68, the connector link 70 may first push the latch 62 such that it rotates in the counterclockwise direction. Continued rotation of the rocker assemblies 68 may then move the link pin 81 above the centerline 94, causing the connector link 70 to pull the latch 62 such that it rotates in the clockwise direction.

During failure of the coupler cylinder 66, while the latches 62, 64 are in the locked position, it may be unlikely for the latch 62 to first be inadvertently rotated counterclockwise by an amount sufficient to move the link pin 81 past the centerline 94, and then fully rotated in the opposite direction to unlock the implement pin 34. In fact, an opening force caused by the implement pin 34 on the latch 62, when the latch 62 is in the locked position, may only serve to further secure the latch 62. More specifically, an opening force in the direction of an arrow 96 may create a clockwise moment about the latch pin 84 that acts on the connector link 70 to create a counterclockwise moment about the rocker pin 86. Because the link pin 81 may be located below the centerline 94, the moments about the latch pin 84 and the rocker pin 86 may combine to secure the rocker assemblies 68 against cross brace 47. Accordingly, any force (e.g., an opening force in the direction of the arrow 96) that the implement pin 34 may apply on the latch 62 may actually further secure the latch 62 in the locked position.

It should be appreciated that wear from repeated use or warping from heavy loading may alter the implement coupler assembly 40 in a manner that inhibits the rocker assemblies 68 from properly seating against the cross brace 47. For this reason, the latch 62 and the rocker assemblies 68 have mating surfaces 98, 100 for securing the locking system 60 in the latched position. For example, when the locking system 60 is in the latched position, as shown in FIG. 5, the moments about the latch pin 84 and the rocker pin 86 may rotate the surfaces 98, 100 into abutting contact, thereby securing the latch 62 in the locked position. It should also be appreciated that the surfaces 98, 100 may be in abutting contact when the locking system 60 is in the latched position, even when the rocker assemblies 68 are properly seated against the cross brace 47, if desired. These abutting surfaces may provide additional support for keeping the latch 62 in the locked position should the coupler cylinder 66 fail.

Figure 6:
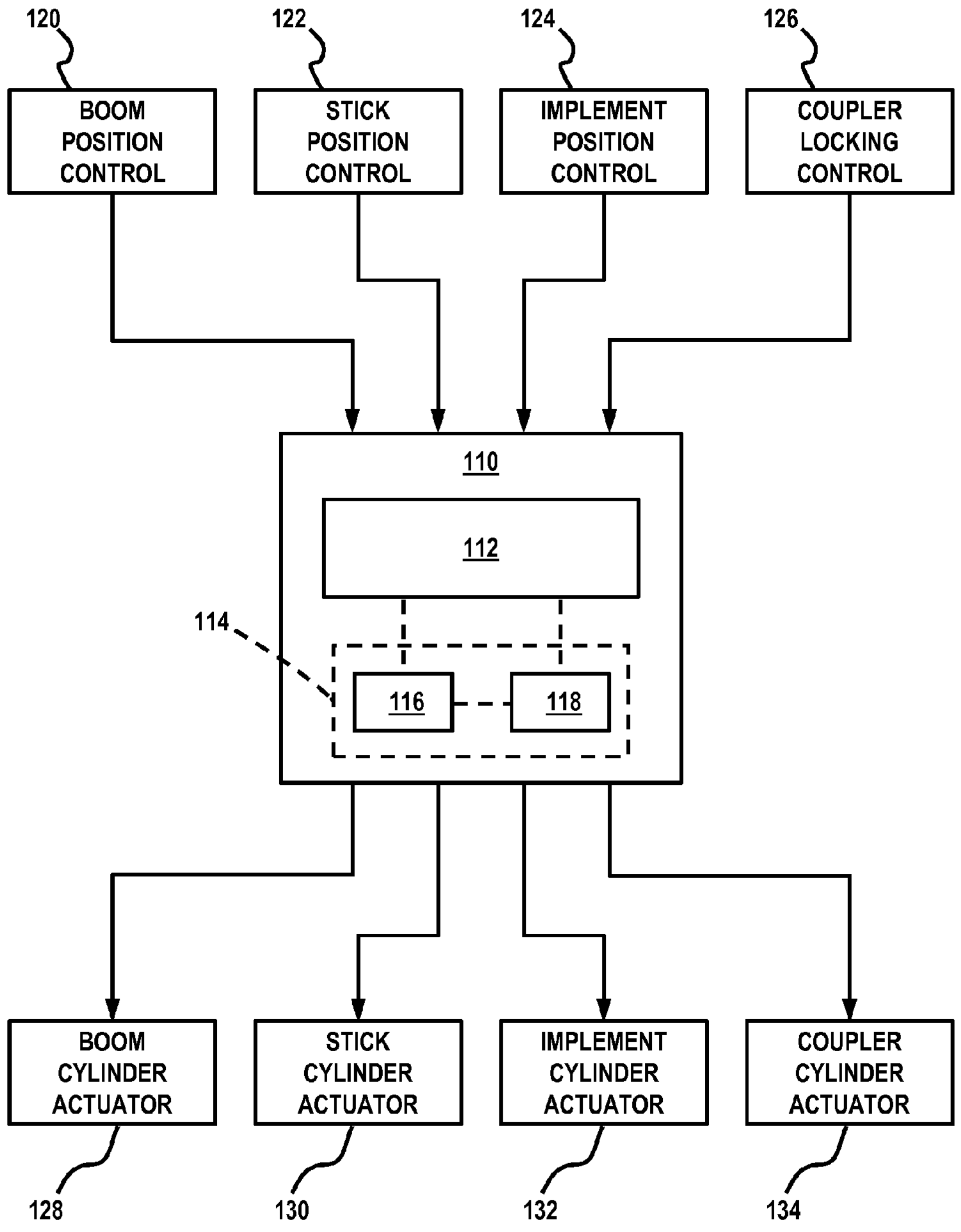
FIG. 6 is a schematic illustration of an exemplary electronic control unit and control components that may be implemented in the exemplary machine of FIG. 1.

The operation of the implement system 14 and the implement coupler assembly 40 may be controlled by a control unit of the machine 10. FIG. 6 illustrates one example of an electronic control module (ECM) 110 that may be implemented in the machine to control the implement system 14, the implement coupler assembly 40 and, if desired, other systems of the machine 10. The ECM 110 may include a microprocessor 112 for executing specified programs that control and monitor various functions associated with the machine 10. The microprocessor 112 includes a memory 114, such as ROM (read only memory) 116, for storing a program or programs, and a RAM (random access memory) 118 which serves as a working memory area for use in executing the program(s) stored in the memory 114. Although the microprocessor 112 is shown, it is also possible and contemplated to use other electronic components such as a microcontroller, an ASIC (application specific integrated circuit) chip, or any other integrated circuit device.

The ECM 110 electrically connects to the control elements of the implement system 14 and the implement coupler assembly 40, as well as various input devices for commanding the operation of implement system 14 and the implement coupler assembly 40 and monitoring their performance. As a result, the ECM 110 may be electrically connected to a boom position control 120, a stick position control 122, an implement position control 124 and a coupler locking control 126 disposed in the operator station 16. An operator of the machine 10 may manipulate the controls 120, 122, 124, 126 to generate and transmit control signals to the ECM 110 with commands for extending and retracting the hydraulic cylinders 22, 28, 30, 66, respectively. The ECM 110 may also be electrically connect to actuators and transmit control signals to the actuators to cause the various systems and elements of the machine 10 to operate. Consequently, a boom cylinder actuator 128, a stick cylinder actuator 130, an implement cylinder actuator 132 and a coupler cylinder actuator 134 may be connected to the ECM 110 and receive control signals from the ECM 110 in response to control signals from the controls 120, 122, 124, 126, respectively, to operate corresponding control valves (not shown) and cause the hydraulic cylinders 22, 28, 30, 66, respectively, to extend and contract. The operation of the implement coupler assembly 40 under the control of the ECM 110 is described in greater detail below.

Figure 7:
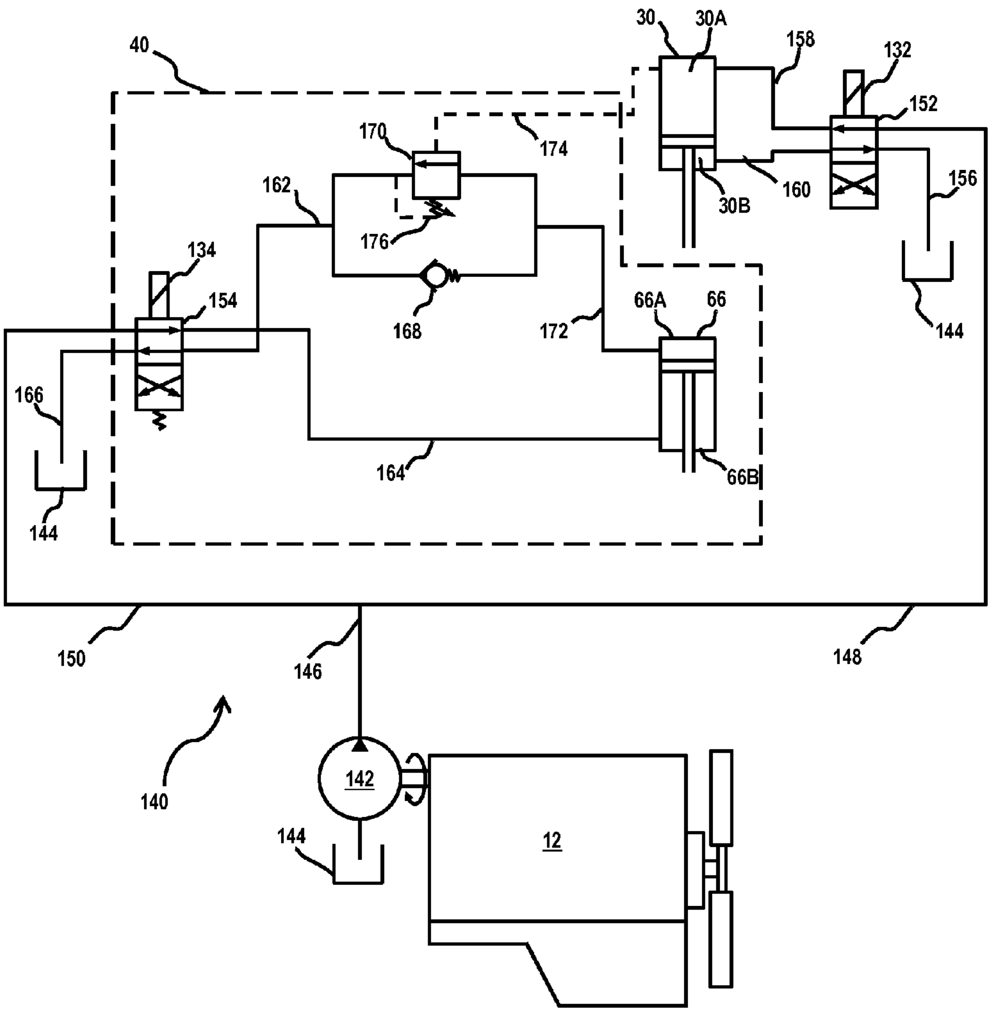
FIG. 7 is a schematic illustration of a hydraulic control system for the implement coupler assembly of FIG. 2 with the coupler cylinder in a retracted position.

As can be seen from the schematic illustration of FIG. 7, the implement coupler assembly 40 may be part of a hydraulic system 140 that also includes the power source 12 and the implement cylinder 30. The power source 12 may drive a pump 142 that draws fluid from a low pressure reservoir 144 and pressurizes the fluid for use by the implement cylinder 30 and the coupler cylinder 66. The pressurized fluid from the pump 142 may be output to a supply passage 146. The supply passage 146 may separate into an implement cylinder supply passage 148 and a coupler cylinder supply passage 150 to communicate the pressurized fluid to an implement control valve 152 and a coupler control valve 154, respectively. The control valves 152, 154 are operatively connected to the implement cylinder actuator 132 and the coupler cylinder actuator 134, respectively, to affect movement of the implement cylinder 30 and the coupler cylinder 66 in response to input received from, for example, the implement position control 124 and the coupler locking control 126 located within the operator station 16 in a manner known to persons skilled in the art. In alternative embodiments, pressurizing fluid may be provided to the control valves 152, 154 by separate pumps 142 or other pressurized fluid sources.

The implement control valve 152 may regulate operation of the implement cylinder 30 and, thus, the motion of the implement 18 relative to the stick member 24. Specifically, the implement control valve 152 may have elements movable to control a flow of pressurized fluid from the pump 142 to the head end 30A and the rod end 30B of the implement cylinder 30, and from the head end 30A and the rod end 30B to the low pressure reservoir 144 via a drain passage 156. In response to a command from the implement position control 124 to extend the implement cylinder 30 and thereby curl the implement 18 toward the stick member 24, the ECM 110 causes the implement cylinder actuator 132 to move the elements of the implement control valve 152 to allow the pressurized fluid from the pump 142 to enter and fill the head end 30A of the implement cylinder 30 via the supply passage 148 and a head end passage 158, while simultaneously draining fluid from the rod end 30B of the implement cylinder 30 to the reservoir 144 via a rod end passage 160 and the drain passage 156. In response to a command from the implement position control 124 to retract the implement cylinder 30 and rotate the implement 18 away from the stick member 24, the ECM 110 causes the implement cylinder actuator 132 to move the elements of the implement control valve 152 to allow pressurized fluid from the pump 142 to enter and fill the rod end 30B of the hydraulic cylinder 30 via the supply passage 148 and the rod end passage 160, while simultaneously draining fluid from the head end 30A of the implement cylinder 30 to the reservoir 144 via the head end passage 158 and the drain passage 156.

The implement coupler assembly 40 may be connected to receive pressurized fluid from the pump 142, and the operation of the implement coupler assembly 40 may be regulated, at least in part, by the implement cylinder 30. More particularly, the coupler control valve 154 associated with the implement coupler assembly 40 may be fluidly connected to the pump 142 by the supply passage 150. The coupler control valve 154 may, in turn, may have a head end passage 162 for placing the coupler control valve 154 in fluid communication with the head end 66A of the coupler cylinder 66, and a rod end passage 164 placing the coupler control valve 154 in fluid communication with the rod end 66B of the coupler cylinder 66. On the head end side, a one-way check valve 168 and a sequence valve 170 may be arranged in parallel to each other. The head end passage 162 fluidly connects the valves 168, 170 to the coupler control valve 154, and an additional head end passage 172 fluidly connects the opposite ends of the valves 168, 170 to the head end 66A of the coupler cylinder 66. The check valve 168 is arranged to allow pressurized fluid to flow from the coupler control valve 154 to the head end 66A of the coupler cylinder 66, and the sequence valve 170 is arranged to control the flow of fluid from the head end 66A of the coupler cylinder 66 to the coupler control valve 154. The operations of the check valve 168 and the sequence valve 170 are discussed in greater detail below. The coupler control valve 154 may also be connected to the low pressure reservoir via a drain passage 166. With this arrangement, based on input received from the coupler locking control 126 located within the operator station 16, the coupler control valve 154 may selectively direct pressurized fluid from the pump 142 to either the head end 66A or the rod end 66B via the supply passage 150, while simultaneously draining fluid from the other of head end 66A or the rod end 66B to the reservoir 144 via the drain passage 166 to cause the coupler cylinder 66 to move. The coupler cylinder 66 may be extended and retracted in a manner similar to that described above with respect to the implement cylinder 30 subject to the position of the implement cylinder 30.

The check valve 168 and the sequence valve 170 located between the head end passages 162, 172 regulate the filling and draining of the head end 66A of the coupler cylinder 66. The check valve 168 allows fluid to selectively bypass the sequence valve 170. The check valve 168 may be movable to only allow fluid into the head end 66A of the coupler cylinder 66 based on a pressure of fluid within the head end 66A. That is, when a pressure of fluid within the head end passage 162 upstream of the valves 168, 170 (i.e., when a pressure of fluid received from the pump 142) is greater than a pressure of fluid within the head end passage 172 downstream of the valves 168, 170 (i.e., greater than a pressure of fluid within the head end 66A of the coupler cylinder 66), fluid may flow past the check valve 168 and into the head end 66A of the coupler cylinder 66. When the pressure of fluid with the head end passage 172 downstream of the valves 168, 170 (i.e., when a pressure of the low pressure reservoir 144) is less than the pressure of fluid within the head end 66A, the check valve 168 closes to divert fluid from the head end 66A to the sequence valve 170.

The sequence valve 170 selectively allows fluid from within the head end 66A of the coupler cylinder 66 to drain to the reservoir 144 via the coupler control valve 154 based on a pressure within the head end 30A of the implement cylinder 30. That is, the sequence valve 170 may be a spring-biased, pilot-operated valve that is movable between a first position at which fluid flow out of the head end 66A is inhibited, and a second position at which fluid flow out of the head end 66A is allowed. The sequence valve 170 may receive a first pilot signal pressure via a first pilot passage 174 that is in fluid communication with the head end 30A of the implement cylinder 30, and may be moved from the first position toward the second position when a pressure of fluid within the first pilot passage 174 (i.e., when a pressure of fluid within the head end 30A of the implement cylinder 30) exceeds a predetermined threshold pressure.

In one example, where the pump 142 is capable of pressurizing fluid to approximately 5,200 psi, the predetermined threshold pressure may be set in the range of about 4,000-5,000 psi. In the illustrated example, the sequence valve 170 may received a second pilot signal pressure via a second pilot passage 176 that is in fluid communication with the head end passage 162. The second pilot signal pressure may provide a reference pressure against which the pressure of the head end 30A of the implement cylinder 30 is compared to control the elements of the sequence valve 170. For example, the sequence valve 170 may be configured with a 3-to-1 ratio of the first pilot signal pressure to the second pilot signal pressure such that the sequence valve 170 moves from the first position to the second position only when the first pilot signal pressure has a magnitude that is at least three times the second pilot signal pressure.

Because the predetermined threshold pressure of the sequence valve 170 may be somewhat elevated compared to a normal operating pressure of the implement system 14, fluid may only be drained from head end 66A of the coupler cylinder 66 when the implement cylinder 30 is fully extended to curl the implement 18 toward the stick member 24 as shown in FIG. 1. That is, 4,000-5,000 psi may only be developed within the head end 30A of the hydraulic cylinder 30 after the hydraulic cylinder 30 has been moved to its end stop position and further manipulated. For this reason, an operator may be required to first fully curl the implement 18 (i.e., fully extend the implement cylinder 30) and continue manipulation in the curling direction for a period of time after reaching the end stop (e.g., for about 5-10 seconds after reaching the end stop) before the coupler cylinder 66 and the implement coupler assembly 40 may be able to fully decouple the implement 18 from the stick member 24. In this manner, a desired implement position (i.e., full implement curl) and a desired operational pressure (about 4,000-5,000 psi) may be ensured prior to allowing implement decoupling.

INDUSTRIAL APPLICABILITY

The presently disclosed implement coupler assembly may be applicable to a variety of machines, such as excavators, backhoes, loaders, and motor graders, to increase the functionality of these machines. For example, a single excavator may be used for moving dirt, rock and other material, and during the excavation operations, different implements may be required such as a different size of bucket, an impact breaker, or a grapple. The disclosed implement coupler assembly can be used to quickly change from one implement to another with ease once the implement 18 is moved to the desired implement position, thus reducing the time the machine is unavailable for its intended purpose.

Figure 8:
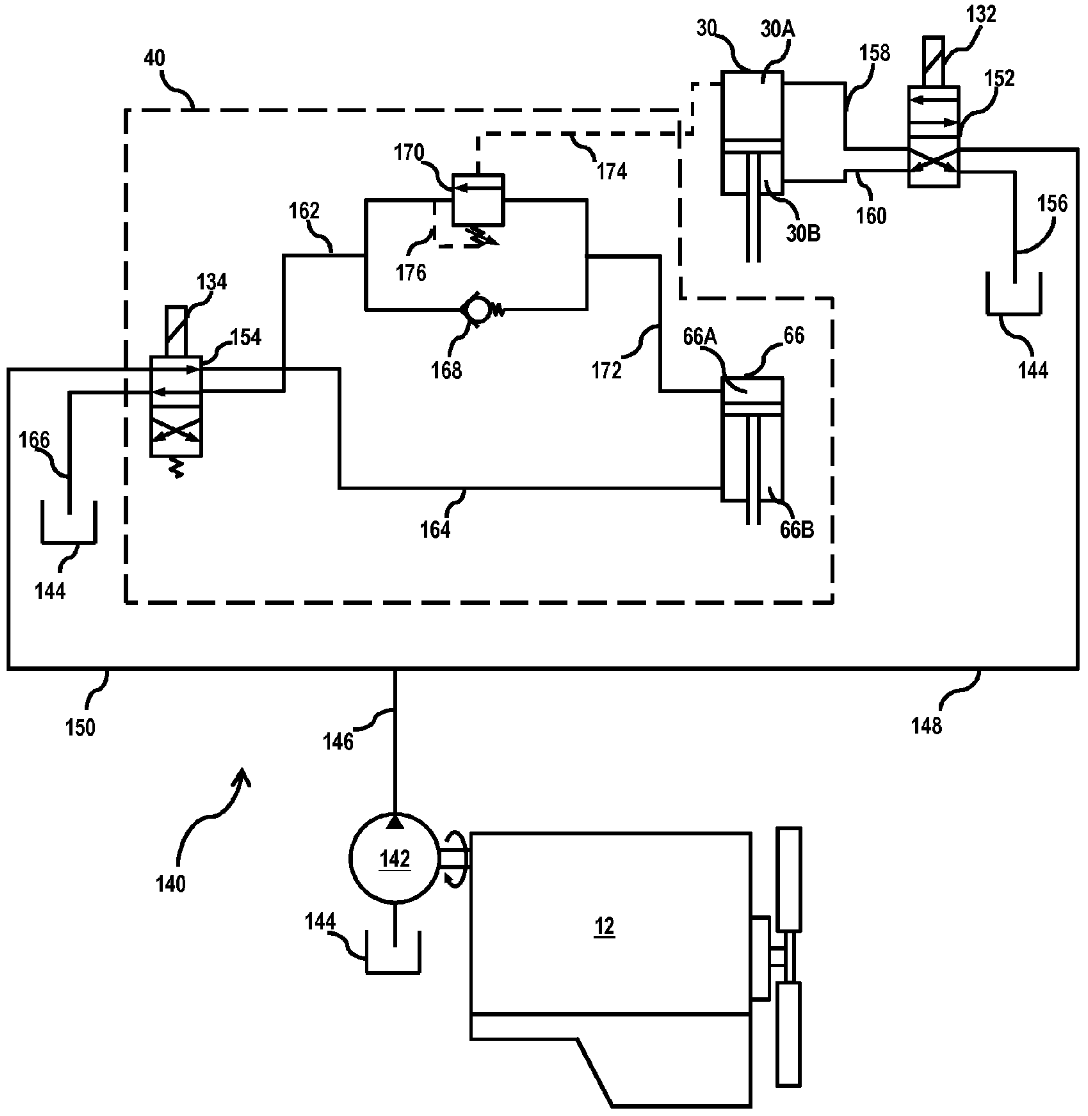
FIG. 8 is a schematic illustration of the hydraulic control system of FIG. 7 with the implement cylinder in a partially retracted position.

To attach an implement 18 to the implement coupler assembly 40, the stick member 24 may be maneuvered to a position at which a bottom portion of the implement coupler assembly 40 is above the implement 18. In the example of FIG. 7, the positioning and orientation of the implement coupler assembly 40 are accomplished in part by extending the implement cylinder 30 to curl the implement coupler assembly 40 toward the stick member 24. Prior to attachment, the coupler cylinder 66 is retracted to put the implement coupler assembly 40 in the unlatched position of FIG. 4. The implement coupler assembly 40 may be oriented so that the notch 56 is located to receive the implement pin 34. The implement coupler assembly 40 may then be lowered onto the implement 18 so that the implement pin 34 is seated within the notch 56. The hydraulic cylinder 30 may next be partially retracted (FIG. 8) to move the power link 31 and thereby pivot the implement coupler assembly 40 about the implement pin 34 such that the notch 58 may be moved over the implement pin 36. The implement pin 36 may then be seated within the notch 58.

Figure 9:
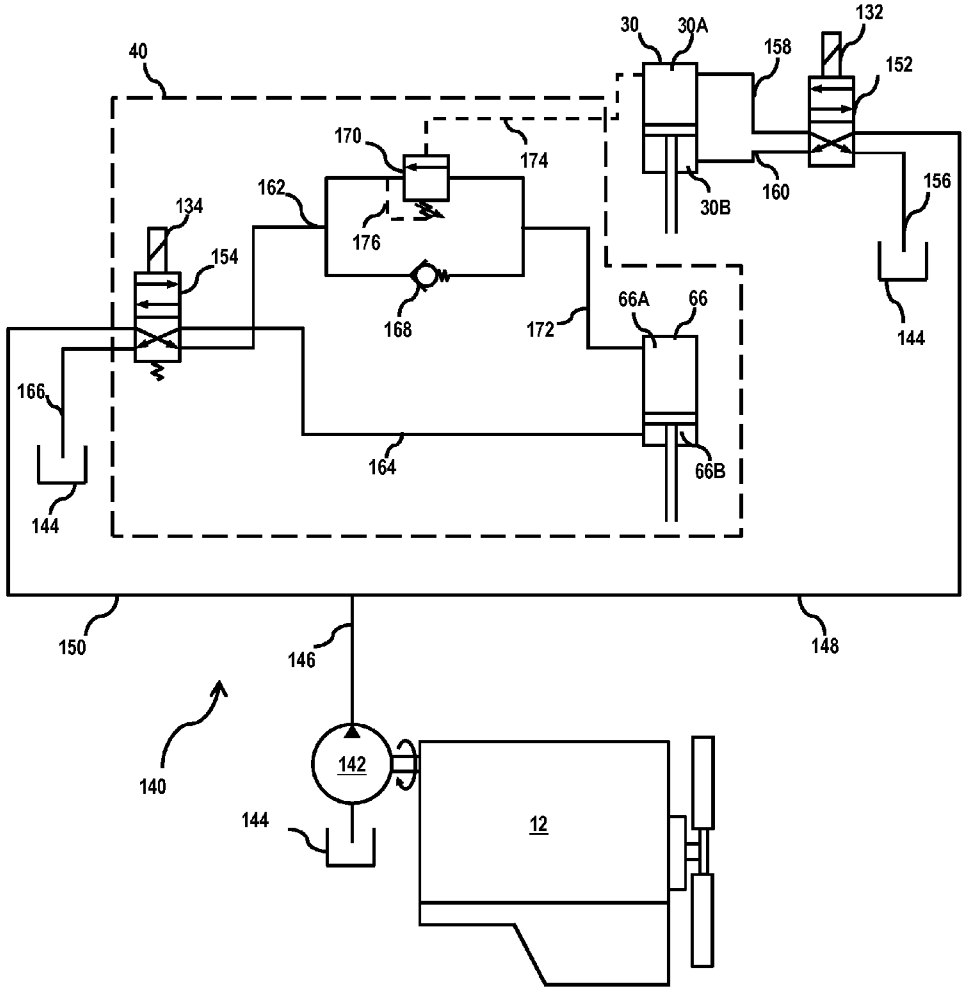
FIG. 9 is a schematic illustration of the hydraulic control system of FIG. 7 with the implement cylinder in a partially retracted position and the coupler cylinder in an extended position.

To lock the implement pins 34, 36 within the notches 56, 58, the coupler locking control 126 may be set by the operator to a "LOCK" position so that the ECM 110 will transmit control signals to the coupler cylinder actuator 134 to move the elements of the coupler control valve 154 to place the pump 142 in fluid communication with the head end 66A of the coupler cylinder 66 and the low pressure reservoir in fluid communication with the rod end 66B of the coupler cylinder 66 so that the coupler cylinder 66 may extend as shown in FIG. 9. Pressurized fluid from the pump 142 opens and flows through the check valve 168 to fill the head end 66A while the fluid from the rod end 66B is drained to the low pressure reservoir 144. As described above with regards to FIG. 5, the extension of the piston rod 76 from the coupler cylinder 66 may first cause the latch 64 to rotate counterclockwise and close on the implement pin 36 until the end stop 92 is engaged, with further extension of the piston rod 76 resulting in translation of the tube portion 78 away from the implement pin 36 and a corresponding counterclockwise rotation of the rocker assemblies 68. The rotation of the rocker assemblies 68 may cause a corresponding translation of the connector links 70, and the counterclockwise rotation of the latch 62 against the implement pin 34. Once the link pin 81 has moved below the centerline 94, both of the implement pins 34, 36 may be locked in position.

Figure 10:
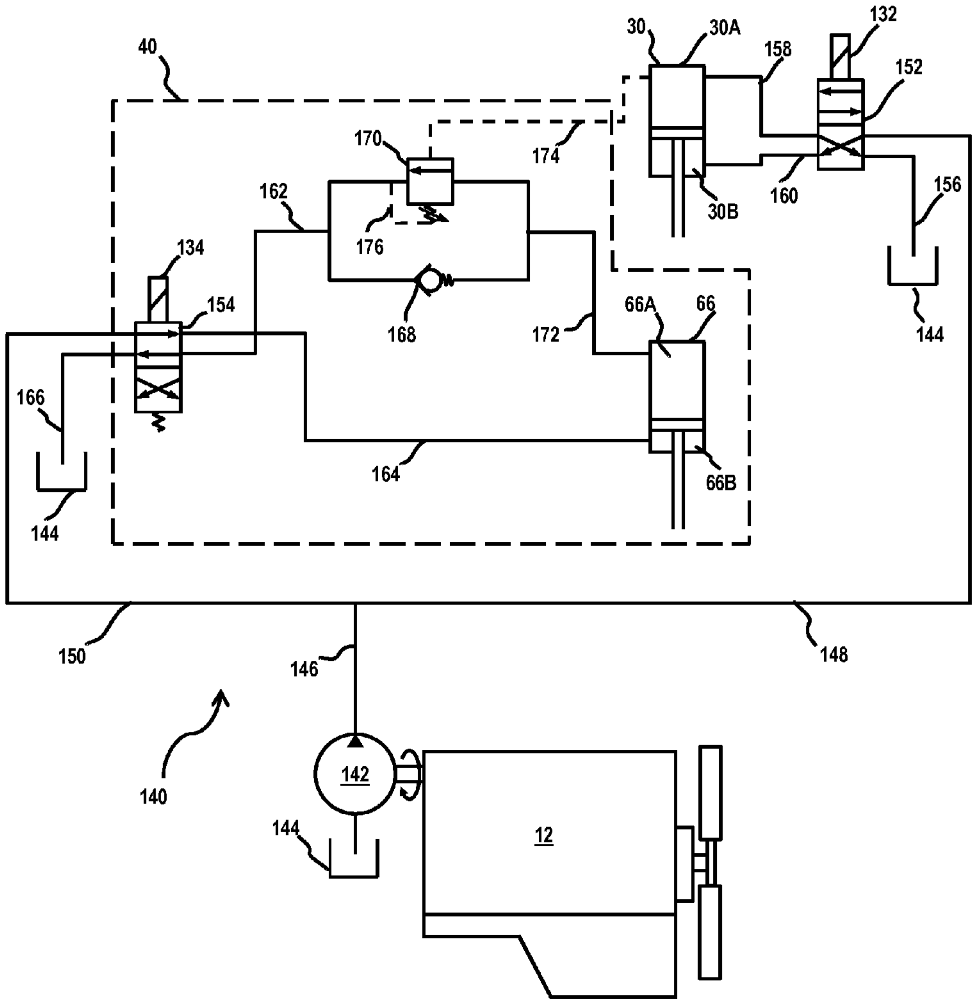
FIG. 10 is a schematic illustration of the hydraulic control system of FIG. 7 with the coupler control valve positioned to cause the coupler cylinder to retract.

To initiate decoupling of the implement 18, an operator may provide an indication of a desire to decouple the implement 18 by, for example, moving the coupler locking control 126 to an "UNLOCK" position. When the coupler locking control 126 is manipulated, the ECM 110 may respond by transmitting control signals to the coupler cylinder actuator 134 to cause the actuator 134 to move the elements of the coupler control valve 154 to place the pump 142 in fluid communication with the rod end 66B of the coupler cylinder 66 and place the low pressure reservoir series with the head end 66A of the coupler cylinder 66 and the valves 168, 170 (FIG. 10). Pressurized fluid may be directed from the pump 142 to the rod end 66B of the coupler cylinder 66. The difference in the pressure between the head end 66A and the low pressure reservoir 144 causes the check valve 168 to close and divert the fluid from the head end 66A to the sequence valve 170.

Depending on the fluid pressure in the head end 30A of the implement cylinder 30 and transmitted to the sequence valve 170 via the first pilot passage, the sequence valve 170 may or may not be open to allow the fluid from the head end 66A to drain to the low pressure reservoir 144. At the position shown in FIG. 10, the implement cylinder 30 is not fully extended and the implement control valve 152 is not positioned to direct pressurized fluid from the pump 142 to the head end 30A and further extend the implement cylinder 30. Consequently, the implement 18 is not fully curled toward the stick member 24 and the pressure in the head end 66A is likely less than the predetermined threshold pressure of the sequence valve 170. Because the head end 30A of the implement cylinder 30 has insufficient fluid pressure to open the sequence valve 170, the flow of fluid from the head end 66A of the coupler cylinder 66 to the low pressure reservoir 144 is cutoff and the piston rod 76 cannot be retracted to unlatch the implement coupler assembly 40.

Figure 11:
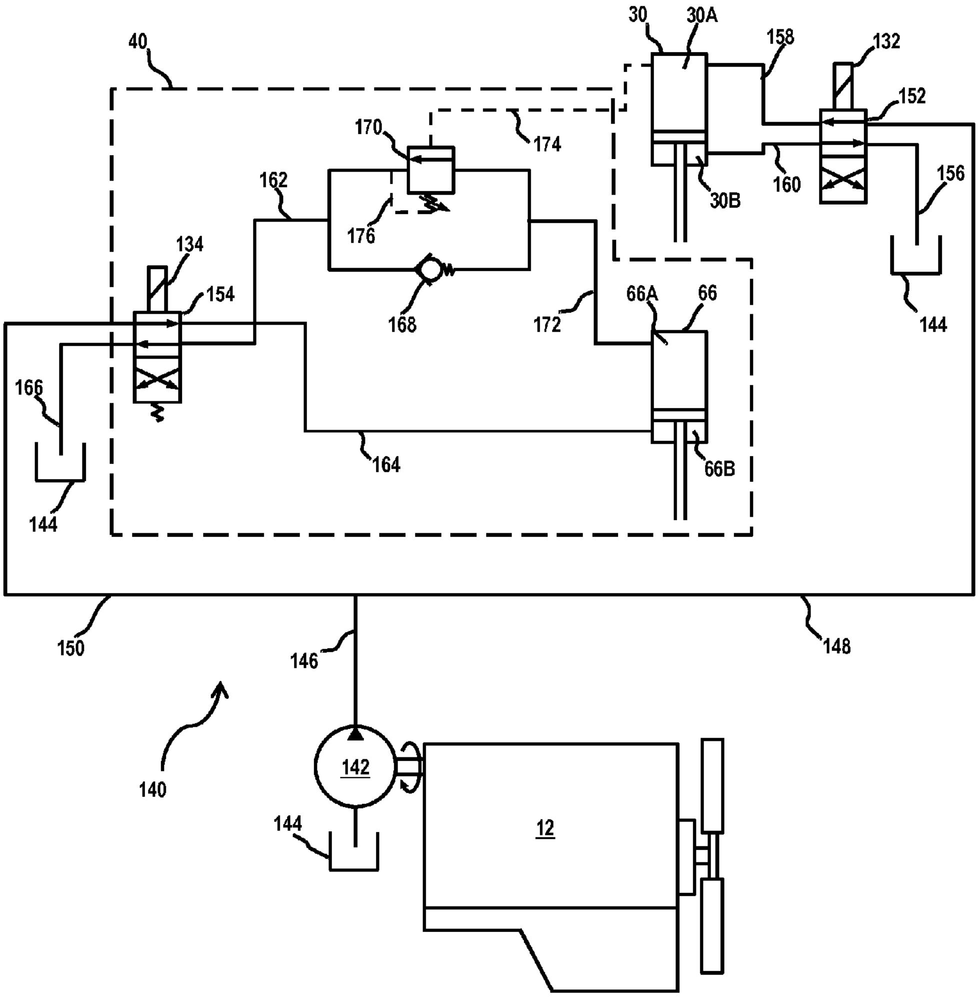
FIG. 11 is a schematic illustration of the hydraulic control system of FIG. 7 with the implement cylinder and the coupler cylinder in extended positions.

To increase the fluid pressure in head end 30A of the implement cylinder 30 to the predetermined threshold pressure of the sequence valve 170, the operator may operate the implement position control 124 to place the implement 18 in the desired implement position, which is the fully-curled position shown in FIG. 1 in the present example. The ECM 110 receives the control signals from the implement position control 124 and responds by transmitting control signals to cause the implement cylinder actuator 132 to move the elements of the implement control valve 152 to the position shown in FIG. 11 to allow the pressurized fluid from the pump 142 to enter and fill the head end 30A of the implement cylinder 30, and to simultaneously drain fluid from the rod end 30B to the reservoir 144. Pressurized fluid may continue to be directed to the head end 30A of the hydraulic cylinder 30 until an end stop position is achieved and the pressure within the head end 30A of the hydraulic cylinder 30 reaches the predetermined threshold pressure of the sequence valve 170. Until the predetermined threshold pressure within the head end 30A is reached, the coupler cylinder 66 may be hydraulically locked and inhibited from releasing fluid that would allow the coupler cylinder 66 to retract the piston rod 76.

Once the implement 18 is rotated to the desired implement position and the predetermined threshold pressure for the sequence valve 170 is created within the head end 30A of the hydraulic cylinder 30, the pressurized fluid from the head end 30A may move the sequence valve 170 to the flow-passing position, thereby releasing fluid from and hydraulically unlocking the coupler cylinder 66. By releasing fluid from the head end 66A of the coupler cylinder 66, the pressurized fluid entering the rod end 66B from the pump 142 may cause the piston rod 76 to retract relative to the tube portion 78 toward the position of the coupler cylinder 66 shown in FIG. 7. Such retraction may rotate the latch 64 away from the implement pin 36 until the latch 64 contacts the end stop 90. Once the latch 64 contacts the end stop 90, the retracting piston rod 76 may pull the tube portion 78, including the rocker assemblies 68 connected thereto, toward the latch 64. The rotating the rocker assemblies 68 may move the links 70 out of the over-center position, causing the latch 62 to rotate away from the implement pin 34.

Unlocking of the implement coupler assembly 40 may be confirmed visually by an operator of the machine 10. Alternatively, a sensor (not shown) may be associated with one or both of the latches 62, 64, if desired, to provide the desired confirmation. After confirmation of latch unlocking, the stick member 24 and the implement coupler assembly 40 may be separated from the implement 18 for connection to another implement, if desired.

It may be possible to partially automate the process for unlocking the implement coupler assembly 40 so that the operator is not required to perform the additional manual step of operating the implement position control 124 to move the implement 18 to the desired implement position. In some embodiments, the machine 10 may be configured with sensors (not shown) providing feedback to the ECM 110 regarding operating parameters of the machine 10, such as pressure sensors for the hydraulic cylinders 22, 28, 30, 66, positions for the hydraulic cylinders 22, 28, 30, 66, the boom member 20, the stick member 24 and the implement 18, and the like, that may allow the ECM 110 to determine whether the implement 18 is oriented in the desired implement position. The ECM 110 may be configured to evaluate the sensor data when the operator moves the coupler locking control 126 to the "UNLOCK" position and determine whether the fluid pressure in the head end 30A of the implement cylinder 30 exceeds the predetermined threshold pressure of the sequence valve 170. If the head end 30A has insufficient pressure to move the sequence valve 170 to the open position, the ECM 110 may automatically transmit control signals to cause the implement cylinder actuator 132 to move the elements of the implement control valve 152 to fluidly connect the pump 142 to the head end 30A of the implement cylinder 30 to move the implement 18 to the desired implement position and increase the pressure in the head end 30A.

The presently disclosed implement coupler assembly 40 may help ensure proper coupling and decoupling of the implement 18, and decoupling only when the implement 18 is in a desired implement position. In particular, the disclosed implement coupler assembly may require movement of implement 18 to a desired position (i.e., full curl as shown in FIG. 1) before decoupling can begin. Moreover, placing the head end 66A of the coupler cylinder 66 in fluid communication with the pump 142 via the coupler control valve 154 allows the coupler cylinder 66 to directly receive pressurized fluid from the pump 142 when the coupler cylinder 66 is extended and the implement coupler assembly 40 is locked. The pump 142 constantly operates to supply pressurized fluids to various components and systems of the machine 10. As a result, the fluid pressure within the head end 66A of the coupler cylinder 66 is consistently maintained while the implement system 14 operates to manipulate the implement 18 as necessary to perform the required work of the machine 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A hydraulic system for locking and unlocking an implement coupler assembly of a machine, the implement coupler assembly having a coupler frame and a locking system connected to the coupler frame and having a locked position and an unlocked position, the hydraulic system comprising:

a coupler hydraulic actuator having a first chamber and a second chamber separated from the first chamber, wherein the coupler hydraulic actuator is connected to the implement coupler assembly, wherein fluid flow into the first chamber causes the coupler hydraulic actuator to move the implement coupler assembly toward the locked position, and fluid flow out of the first chamber causes the coupler hydraulic actuator to move the implement coupler assembly toward the unlocked position;

a sequence valve having a first sequence port in fluid communication with the first chamber of the coupler hydraulic actuator, a second sequence port, and a first pilot port in fluid communication with an implement hydraulic actuator operatively connected to the implement coupler assembly to move the implement coupler assembly relative to an implement system of the machine, wherein the sequence valve prevents fluid flow from the first sequence port to the second sequence port when a fluid pressure at the first pilot port is less than a predetermined threshold pressure, and wherein the sequence valve is movable to allow fluid flow from the first sequence port to the second sequence port and out of the first chamber when a pilot fluid pressure of the implement hydraulic actuator at the first pilot port is greater than the predetermined threshold pressure.

2. The hydraulic system of claim 1, comprising a coupler control valve in fluid communication with the second chamber of the coupler hydraulic actuator, the second sequence port, a pressurized fluid source of the machine, and a low pressure reservoir of the machine, wherein the coupler control valve is movable to alternately place the second chamber in fluid communication with the pressurized fluid source and the second sequence port in fluid communication with the low pressure reservoir, and place the second chamber in fluid communication with the low pressure reservoir and the second sequence port in fluid communication with the pressurized fluid source.

3. The hydraulic system of claim 1, wherein the sequence valve comprises a second pilot port in fluid communication with the second sequence port, and the sequence valve is configured to increase the predetermined threshold pressure when an increase in a fluid pressure at the second sequence port is detected via the second pilot port.

4. The hydraulic system of claim 1, comprising a check valve having a first check valve port in fluid communication with the first chamber and a second check valve port in fluid communication with the second sequence port, where the check valve is moveable to allow fluid flow from the first check valve port to the second check valve port and into the first chamber when a fluid pressure at the second check valve port is greater than a fluid pressure at the first check valve port.

5. The hydraulic system of claim 4, comprising a coupler control valve having a first control valve port in fluid communication with a pressurized fluid source of the machine, a second control valve port in fluid communication with a low pressure reservoir of the machine, a third control valve port in fluid communication with the second chamber of the coupler hydraulic actuator, and a fourth control valve port in fluid communication with the second sequence port and the second check valve port, wherein the coupler control valve is movable between a first control valve position wherein the first control valve port is fluid communication with the third control valve port and the second control valve port is in fluid communication with the fourth control valve port, and a second control valve position wherein the first control valve port is in fluid communication with the fourth control valve port and the second control valve port is in fluid communication with the third control valve port.

6. The hydraulic system of claim 5, wherein the coupler hydraulic actuator moves the implement coupler assembly to the locked position when the coupler control valve is in the second control valve position.

7. The hydraulic system of claim 5, wherein the coupler hydraulic actuator moves the implement coupler assembly to the unlocked position when the coupler control valve is in the first control valve position and the pilot fluid pressure of the implement hydraulic actuator at the first pilot port is greater than the predetermined threshold pressure.

8. The hydraulic system of claim 5, wherein the coupler hydraulic actuator does not move the implement coupler assembly to the unlocked position when the coupler control valve is in the first control valve position and the pilot fluid pressure of the implement hydraulic actuator at the first pilot port is less than the predetermined threshold pressure.

9. A method of decoupling an implement from an implement coupler assembly of a machine, comprising:

communicating pressurized fluid to a first chamber of a coupler hydraulic actuator to move the coupler hydraulic actuator in a direction to unlock the implement coupler assembly;

communicating pressurized fluid from a second chamber of the coupler hydraulic actuator to a first sequence port of a sequence valve; and communicating pressurized fluid from an implement hydraulic actuator to a first pilot port of the sequence valve, wherein a fluid pressure of pressurized fluid at the first pilot port determines a position of the sequence valve between a closed position preventing fluid flow from the first sequence port to a second sequence port of the sequence valve, and an open position allowing fluid flow from the first sequence port to the second sequence port and to low pressure reservoir in fluid communication with the second sequence port.

10. The method of claim 9, comprising moving the sequence valve to a closed position when the fluid pressure at the first pilot port is less than a predetermined threshold pressure so that the fluid in the second chamber of the coupler hydraulic actuator is not communicated to the low pressure reservoir and the coupler hydraulic actuator does not move in the direction to unlock the implement coupler assembly.

11. The method of claim 10, comprising moving the sequence valve to an open position when the fluid pressure at the first pilot port is greater than the predetermined threshold pressure so that the fluid in the second chamber of the coupler hydraulic actuator is communicated to the low pressure reservoir and the coupler hydraulic actuator moves in the direction to unlock the implement coupler assembly.

12. The method of claim 10, comprising:

fluidly connecting the second sequence port to a second pilot port of the sequence valve; and determining the predetermined threshold pressure based on a fluid pressure of the fluid communicated from the second sequence port to the second pilot port.

13. The method of claim 12, wherein the predetermined threshold pressure increases when the fluid pressure communicated to the second pilot port increases.

14. The method of claim 12, wherein the predetermined threshold pressure decreases when the fluid pressure communicated to the second pilot port decreases.

15. A hydraulic system for locking and unlocking an implement coupler assembly of a machine, the implement coupler assembly having a coupler frame and a locking system connected to the coupler frame and having a locked position and an unlocked position, the hydraulic system comprising:

a coupler hydraulic actuator having a first chamber and a second chamber separated from the first chamber;

a coupler control valve having a first control valve port in fluid communication with a pressurized fluid source of the machine, a second control valve port in fluid communication with a low pressure reservoir of the machine, a third control valve port and a fourth control valve port;

a sequence valve having a first sequence port in fluid communication with the first chamber, a second sequence port in fluid communication with the fourth control valve port, and a first pilot port in fluid communication with an implement hydraulic actuator operatively connected to the implement coupler assembly to move the implement coupler assembly relative to an implement system of the machine; and a check valve having a first check valve port in fluid communication with the first chamber and a second check valve port in fluid communication with the fourth control valve port, where the check valve is moveable to allow fluid flow from the second check valve port to the first check valve port and into the first chamber when a fluid pressure at the second check valve port is greater than a fluid pressure at the first check valve port, wherein the coupler hydraulic actuator is connected to the implement coupler assembly, fluid flow into the first chamber causes the coupler hydraulic actuator to move the implement coupler assembly toward the locked position, and fluid flow out of the first chamber causes the coupler hydraulic actuator to move the implement coupler assembly toward the unlocked position, and wherein the sequence valve prevents fluid flow from the first sequence port to the second sequence port when a fluid pressure at the first pilot port is less than a predetermined threshold pressure, and wherein the sequence valve is movable to allow fluid flow out of the first chamber when a pilot fluid pressure of the implement hydraulic actuator at the first pilot port is greater than the predetermined threshold pressure.

16. The hydraulic system of claim 15, wherein the coupler control valve is movable between a first control valve position wherein the first control valve is in fluid communication with the third control valve port and the second control valve port is in fluid communication with the fourth control valve port, and a second control valve position wherein the first control valve port is in fluid communication with the fourth control valve port and the second control valve port is in fluid communication with the third control valve port.

17. The hydraulic system of claim 16, wherein the coupler hydraulic actuator moves the implement coupler assembly to the locked position when the coupler control valve is in the second control valve position.

18. The hydraulic system of claim 16, wherein the coupler hydraulic actuator moves the implement coupler assembly to the unlocked position when the coupler control valve is in the first control valve position and the pilot fluid pressure of the implement hydraulic actuator at the first pilot port is greater than the predetermined threshold pressure.

19. The hydraulic system of claim 16, wherein the coupler hydraulic actuator does not move the implement coupler assembly to the unlocked position when the coupler control valve is in the first control valve position and the pilot fluid pressure of the implement hydraulic actuator at the first pilot port is less than the predetermined threshold pressure.

20. The hydraulic system of claim 15, wherein the sequence valve comprises a second pilot port in fluid communication with the second sequence port, and the sequence valve is configured to increase the predetermined threshold pressure when an increase in a fluid pressure at the second sequence port is detected via the second pilot port.

* * * * *